Aug. 31, 1965 W. H. GRAVERT 3,203,444
AUTOMATIC ULLAGE CONTROL APPARATUS FOR MARINE TANKERS
Filed July 11, 1963 3 Sheets-Sheet 1

INVENTOR
William H. Gravert
BY Max L. Libman
ATTORNEY

Aug. 31, 1965
W. H. GRAVERT
3,203,444
AUTOMATIC ULLAGE CONTROL APPARATUS FOR MARINE TANKERS
Filed July 11, 1963
3 Sheets-Sheet 3
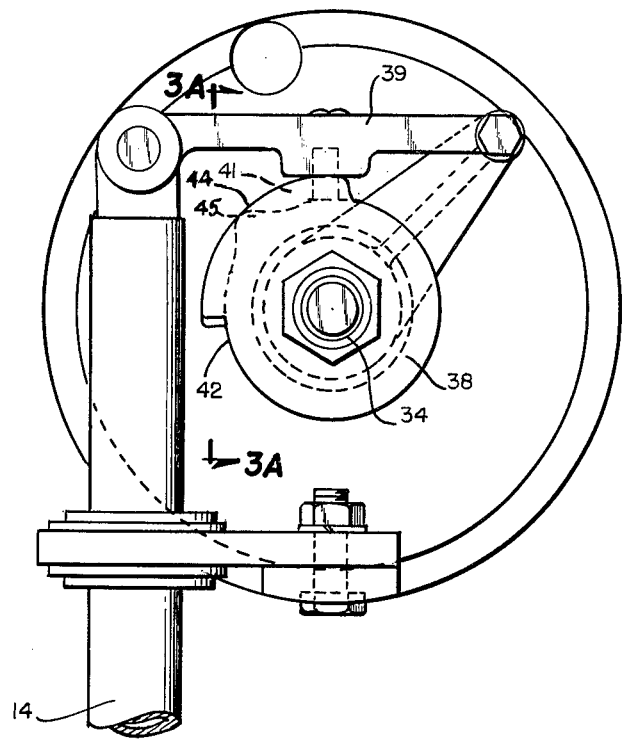
FIG. 3.
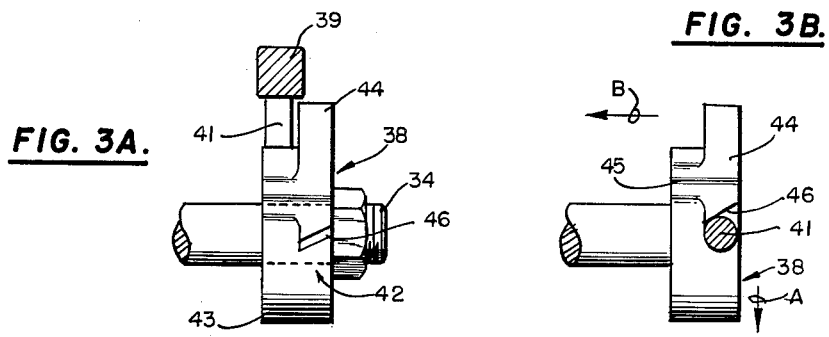
FIG. 3A.
FIG. 3B.
INVENTOR
William H. Gravert
BY  Max L. Libman
ATTORNEY

United States Patent Office

3,203,444
Patented Aug. 31, 1965

3,203,444
AUTOMATIC ULLAGE CONTROL APPARATUS
FOR MARINE TANKERS
William H. Gravert, Port Washington, N.Y., assignor to
Marine Moisture Control Company, Inc., Inwood, N.Y.,
a corporation of New York
Filed July 11, 1963, Ser. No. 294,808
6 Claims. (Cl. 137—390)

This invention relates to apparatus for loading marine tankers, and has for its primary object the provision of means for automatically shutting off the valve to a liquid storage compartment of a marine tanker when the level of liquid supplied to said compartment has reached a predetermined amount.

In modern marine tankers, a variety of storage compartments of the tanker may be loaded simultaneously with different kinds of liquids, usually highly combustible petroleum fuel products. In order to facilitate this operation, the present invention provides means whereby each storage tanker compartment can be manually set to automatically shut off the supply of liquid whenever the desired level in the tank has been reached. This both assures accurate control of the loading of the storage tanks, and at the same time requires a minimum of care and supervision during the loading operation by personnel in control of the operation.

The prime purpose in automating the cargo system of large tankers is to reduce the arduous labor associated with cargo handling and to attain, with safety, high loading and unloading rates in addition to reducing operating costs through reduction of manpower. Large tankers now load at peak rates of 60,000 bbls. per hour and discharge at rates up to 37,000 bbls., per hour at modern terminals. When loading at these high rates a large number of cargo valves must be opened and closed rapidly to avoid overflows. With the relatively small number of men available, this becomes a tremendous task and introduces an element of danger. An oil overflow can result in fire, or harbor pollution with the possibility of attendant fines. In some instances masters of vessels actually have been jailed for harbor contamination. When discharging at high rates with large centrifugal pumps, a number of tanks are usually discharged simultaneously. When shifting from one group to another the cargo valves must be opened and closed rapidly to avoid having the cargo pumps lose suction, overspeed and trip out.

At sea, ballasting, deballasting and tank cleaning often occur during bad weather. Dashing around a slippery deck covered with obstacles with the vessel rolling heavily while opening and closing valves can be extremely hazardous and requires agility beyond that possessed by many sturdy seamen. This hazard is compounded during the hours of darkness. Even during good weather the distance from the most forward tank to the after pumproom on the new large tankers has increased until even an agile seaman cannot efficiently cover the required territory if it is necessary to turn the cargo valves by hand.

It is therefore highly advantageous to provide remote hydraulic controls which can be grouped at one control location for operation by a single operator.

Since marine equipment is often unused for long periods during the voyage, it is desirable to provide equipment which is "fail-safe" in operation, that is, cannot be used at all when any part of it is not in proper operating condition. Due to the dangerous and combustible nature of the materials being handled, electrical control apparatus is usually not permitted, and the system is preferably mechanical or hydraulic. The main valves controlling the individual tanks or storage components of the marine tanker are usually many feet below deck, and must be remotely controlled by suitable above-deck control equipment, which is usually hydraulically operated. In a typical system, a hydraulic actuator or fluid motor is usually associated with each remote main valve, which may typically be a butterfly-type valve for controlling the filling and emptying of the tank or storage compartment. A four-way hydraulic control valve is used to provide pressure fluid to the actuator in one direction or the other to respectively open or shut the main valve, or to shut off the supply of pressure fluid to the actuator when the filling or emptying operation is completed. A typical system of this type is shown in my copending application, Serial No. 209,142, filed July 11, 1962, for Marine Tanker Fluid Cargo Control. The present invention relates to a generally similar control system, except that instead of the four-way valve being manually controlled, it is automatically controlled by specially designed float apparatus according to the present invention, which operates the four-way control valve to in turn shut off the main supply valve to the storage compartment being controlled.

It is a major object of the invention to provide a highly reliable fail-safe float-type hydraulic control valve for the above purpose.

Another object is to provide a float-type hydraulic control valve apparatus which is manually initiated in such fashion as to insure the proper operation of the equipment.

According to the invention, a float element is provided in conjunction with a remotely located hydraulic control valve or actuator for controlling the hydraulic motor which operates the supply valve of the tank. Means are provided for manually setting the control valve to a spring-biased or counter-weighted open position from which it tends to return to closed position. Return to closed position is prevented by a catch associated with the float element which is effective when the float element is down due to level of liquid in the tank being below that for which the float element is set. As the level rises, the float element releases the catch, permitting the spring-biased or counter-weighted control valve to return to its normal closed position, thus operating the hydraulic actuator to shut off the supply valve and preventing overfilling of the tank.

The specific nature of the invention, as well as other objects and advantages thereof, will clearly appear from a description of a preferred embodiment as shown in the accompanying drawings, in which:

FIG. 3 is a rear view of the control apparatus viewed from within the cargo trunk;

FIG. 3A is a detail view taken on line 3A—3A of FIG. 3; and

FIG. 3B is a detail view of the latch disc in the engaged condition.

Figure 1:
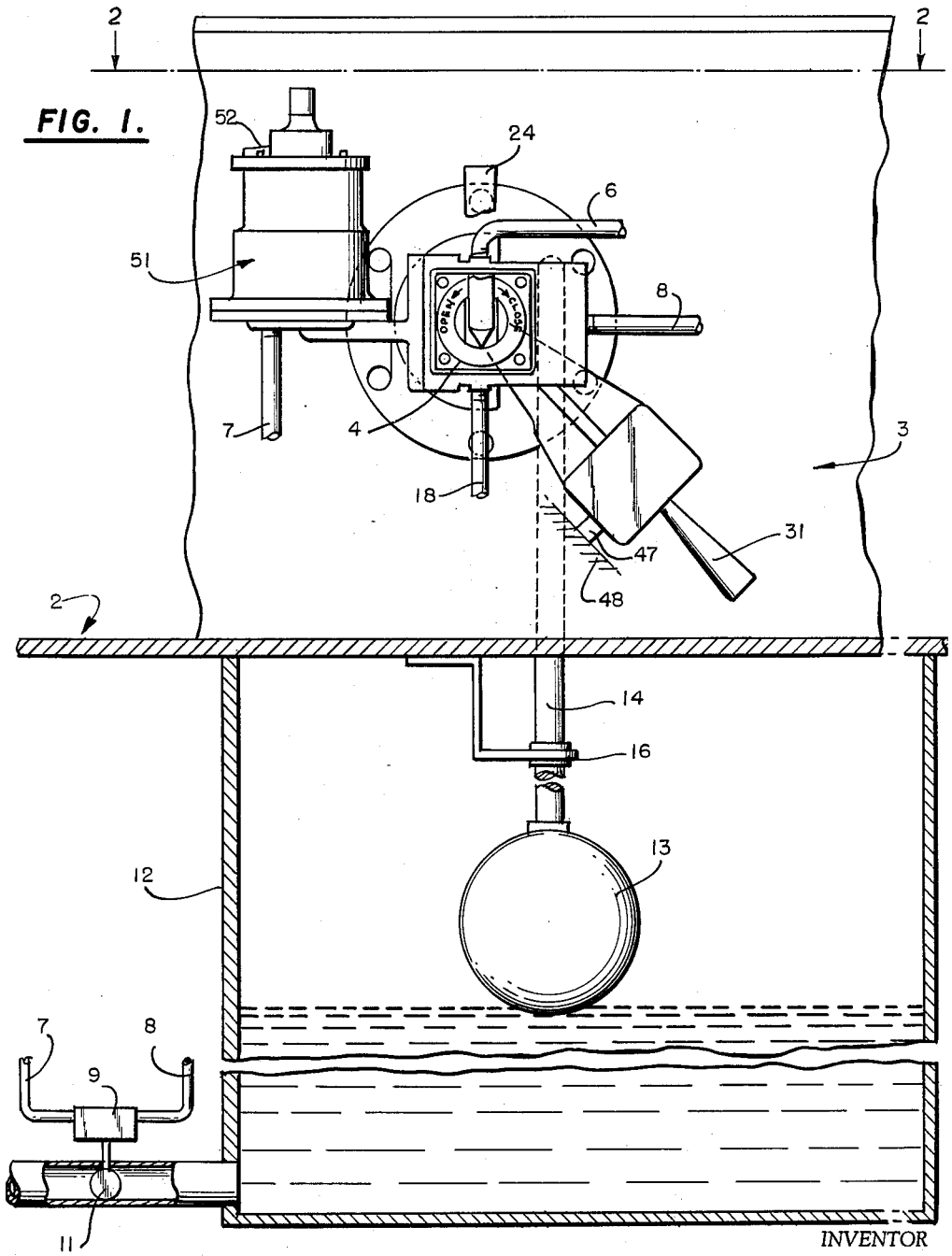
FIG. 1 is a front elevational view of a system according to the invention.

Referring to FIG. 1, and with reference to the deck 2 of the marine tanker on which the equipment is used, the cargo trunk 3 typically extends for a couple of feet above the deck in the form of a metal box or cylinder three or four feet in diameter. Each cargo trunk sits directly above a cargo tank 12, of which there may be a large number, and usually has several removable covers in the side thereof, providing necessary access to the cargo tank for cleaning, servicing, etc. The actuator control valve 4 is mounted on the side of the cargo trunk, as shown in more detail in FIG. 2, and controls the pressure fluid from a suitable pressure source (not shown) in line 6 to either line 7 or line 8, depending upon the position to which the control valve is set. Lines 7 and 8 supply pressure fluid in one direction or the other to the hydraulic actuator 9 from controlling the operation and position of butterfly valve 11 and thereby control the supply of fluid material to and from a storage or cargo tank 12, which is below deck.

A float 13 is provided within the tank, and is attached to a rod 14 which is slidable vertically within one or more supporting brackets 16 which are suitably attached to any fixed part of the vessel. Rod 14 extends up through the deck to the interior of the cargo trunk 3, and as will be shown below, in its upper position, when the desired level of liquid in the tank 12 has been reached, insures that the actuator valve 4 is operated to shut the butterfly valve 11.

Actuator valve 4 is normally biased to the closed position in which handle 24 is vertical and pressure line 6 is cut off from lines 7 and 8. By operating handle 24 as will be shown below, pressure line 6 is connected to one of lines 7 or 8, for example, line 7, to operate hydraulic actuator 9 to open butterfly valve 11. In this position, the other line (e.g., 8) is connected with line 18 to provide a return circuit for fluid flowing through the actuator while it is being operated.

Figure 2:
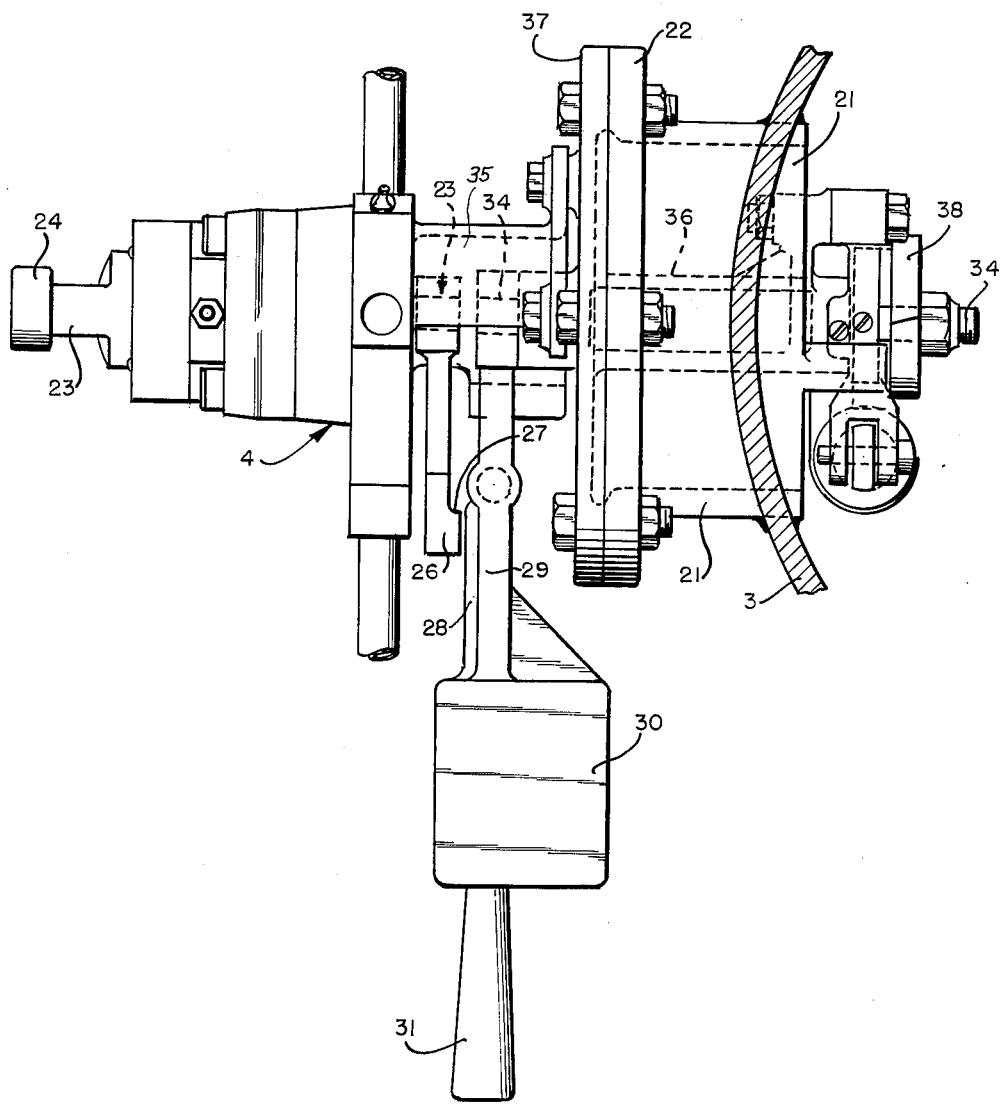
FIG. 2 is a plan view taken on line 2—2 of FIG. 1 of the control apparatus showing its relationship to the side of the cargo trunk.

FIG. 2 shows the manner in which the valve assembly is connected to the cargo trunk 3. A metal tube 21 having a flanged end 22 passes through a hole of corresponding diameter cut in the side of cargo trunk 3, and is suitably fastened to the cargo trunk as by welding. Four-way valve 4 is rotated for operation by a shaft 23, which can be either manually operated by handle 24 or by operation of lever 26 which is keyed to the opposite end of shaft 23. A tab 27 is fixed to lever 26 and extends rearwardly for a short distance toward the cargo trunk so that it can be engaged by foot 28 of crank arm 29 to which is fixed counterweight 30 and handle 31. The entire assembly of 28, 30, and 31 constitutes an operating lever which is fixed to a second shaft 34 in axial alignment with shaft 23, but independently rotatable. Shaft 34 rotates within bearing 36 supported by plate 37 which in turn is bolted to flange 22 previously described. Shaft 34 extends through the center of tube 21 into the cargo trunk, and has fixed to its end disc 38, which therefore rotates with shaft 34. (See FIG. 3.) Shaft 34 preferably has two O-ring seals located within the bearings to make the shaft assembly liquid-tight, and prevent cargo leakage along the shaft. A bracket 35 supports the valve assembly 4 on plate 37 and is so spaced and dimensioned as not to interfere with the desired motion of arm 29.

Float rod 14 is pivotally connected at its upper end to float arm 39 which has a lug 41 adapted to fit into a stop 46 in disc 38.

Shaft 34, and with it arm 29 and disc 38 are also capable of a limited amount of axial sliding motion to the left from the position shown in FIG. 2, for a sufficient distance so that foot 28 can overlie cam 27 for a purpose which will be explained below.

Disc 38 is made in stepped form as best shown in FIG. 3A, and in the condition shown in FIGS. 2 and 3, lug 41 is resting on the lower step 43 of the disc. The upper step 44 is raised relative to lower step 42. In the position shown in FIGS. 3 and 3A, the upper step 44 abuts lug 41 and prevents the shaft 34 from moving to the left. It will be apparent that if the handle 31 is raised from the position shown in FIG. 1, past the horizontal position shown in FIG. 2, for about 90° from its original position (FIG. 1), then the lower step 42 will have been rotated until it is in alignment with the stop 41. During this rotation, lug 41 will pass over cam lobe 45 and momentarily raise arm 39 and float rod 14 to break it free. The assembly is typically used once every two weeks and it can freeze up in bushing 16 and pivot for arm 39. If the float is free, lug 41 will follow the cam contour and float rod will rise and fall, placing it in readiness to engage face 46. If the float rod 14 is not free, it will stay in the raised position, making it impossible to engage face 46 and a dangerous condition is avoided.

With the handle 31 thus raised, the shaft 34 can now be pulled forward toward the operator (to the left) until stop 41 rests within lower step 42, and the foot 28 overlies (but does not yet engage) tab 27. When the handle 31 is now released, the assembly including disc 38 will now rotate for a short distance back toward the original position of the handle, under the influence of counter-weight 30, but since stop 41 is now in lower step 42, face 46 of the upper step of the disc will shortly engage stop 41 and prevent further rotation of the disc and of the arm assembly 29, 30, 31, thus retaining the assembly in the raised position, in which foot 28 overlies tab 27, but is not yet in contact therewith. It will be noted that face 46 of the notch is sloped in such a manner that as the disc tends to rotate in the direction shown by the arrow A (FIG. 3B) due to the effect of the counterweight 30, the disc assembly is urged to the left in the direction of the arrow B. This insures that the parts will remain in operative position with the foot 28 overlying tab 27.

The setting operation above described is performed by an operator prior to or during the filling of the tank, at which time the four-way valve 4 is in the center (or neutral) position. When handle 24 is moved over to the left, the lever 26 accordingly is raised from its closed position by the same number of degrees as the handle 24 has been rotated, since both the lever and the handle are fixed to shaft 23.

The four-way valve 4 is moved to the left, or counter-clockwise, and held there, to open the butterfly valve. When the butterfly valve has opened, as evidenced on the valve position indicator, handle 24 is spring returned to the center position by the operator. Counter weight arm 29 can now be lifted up and pulled out, or to the left, to engage arm 26 attached to the four-way valve shaft 23, if this was not previously done. If the counterweight is now allowed to descend under the force of gravity, foot 28 will engage tab 27 and carry shaft 23 back to its closed position, thus putting the control valve 4 into condition whereby the butterfly valve 11 is closed and the flow of fluid into the cargo tank is stopped. It will be apparent that this occurs automatically, since when the fluid in the tank reaches the upper level at which shut-off should occur, float 13 is raised, lifting arm 14 and float arm 39, which raises stop 41 out of the notch 42, releasing shaft 34 for rotation under the action of counter-weight 30. Any suitable stop means are employed to stop arm 29 when it has traveled for a sufficient distance to accomplish the desired result above described, and a rubber bumper 47 may be used against any suitable stop 48 for this purpose.

Control valve 4 is preferably of the type that is spring-loaded to the center position, which it normally assumes except when it is controlled by the operator, or in the above-described operation, which leaves the control valve 4 in the closed position, with hydraulic fluid under pressure still urging the actuator 9 of the butterfly valve toward the closed position, although the valve has already closed. This does no harm, and the next time one of the operating personnel passes the valve, or notices its condition, he will rotate the manual operating handle 24 back from the "closed" position to the neutral or vertical position in which the pressure line of the hydraulic system is cut off from the actuator, leaving the butterfly valve in its closed position until fluid is again driven through the actuator in the reverse direction to open the butterfly valve.

It will be noted that the control valve is at all times capable of manual control at the will of the operator, by means of handle 24. Likewise, if the trigger mechanism has been set by raising handle 31 as described above, it can be at any time reset by the operator by merely pushing the handle 31 back toward the cargo tank and then letting it down into its original disengaged position shown in FIG. 1. Thus, manual over-ride of the automatic system is possible at all times.

It should be noted that this apparatus may go for several weeks without being used, and is therefore subject to a certain amount of freezing or "seizing." It is an advantageous feature of the device that initially it must be manually set immediately before use by operating the handle 31, which insures that the parts are in operative condition. When the handle 31 is raised, the shaft 34, which may have been idle for some time, is necessarily free or loosened for correct operation. Furthermore, if the float rod has become struck in the up position, the lug 41 will not fall down into the notch 42, showing that this condition exists, so that it can be corrected. The device is therefore "fail-safe."

After the device has been automatically tripped as above described, the operator can reset the handle 31 to the position shown in FIG. 2 by merely pushing it back away from him until foot 28 is disengaged from tab 27. At this time the stop 41 will be entirely out of the way, since the tank is full. It will be noted that in FIG. 1, line 7 does not come directly from control valve 4, but comes instead from valve position indicator 51, which may be of any suitable type. This provides still another check on the proper operation of the system and enables the operator to take proper corrective action if necessary.

It will be apparent that the embodiments shown are only exemplary and that various modifications can be made in construction and arrangement within the scope of my invention as defined in the appended claims.

I claim:
1. In a remotely controlled main valve system for tankers comprising a main fluid supply line for a tank,
   (a) a remotely controlled hydraulic motor for operating said main valve to admit fluid to the tank,
   (b) a control valve for said hydraulic motor,
   (c) a manual control element for operating said control valve,
   (d) said control valve having a neutral position in which the hydraulic motor is at rest, a first position for operating the hydraulic motor to open the main valve and a second position for operating the hydraulic motor to close the main valve,
   (e) float means in said tank responsive to the liquid level in the tank,
   (f) manually settable auxiliary operating means movable from an inactive position in which it is disconnected from the control valve into an active position for operating said control valve to its said second position,
   (g) catch means normally retaining said auxiliary operating means in said active position,
   (h) and release means actuated by said float means at a predetermined level of liquid in the tank to release said manually settable auxiliary operating means from its said active position, to operate said control valve to its said second position to close the main valve.
2. The invention according to claim 1,
   (a) said manual control element comprising a handle having a central position in which the control valve is in the neutral position, a first position and a second position in which the control valve is respectively in its first and second positions,
   (b) a projection fixed to and movable with said handle,
   (c) said manually settable auxiliary operating means having a lever angularly movable from a normal angular position corresponding to the second position of the handle, to an active angular position, and axially movable in said active angular position from a free position to an engaged position in which it engages said projection, and means biasing said lever toward said normal position.
3. The invention according to claim 2,
   (a) said release means comprising a latching element movable from a latching position corresponding to a low position of said float means to an unlatching position corresponding to a high position of said float means,
   (b) and a catch fixed to said lever and movable therewith, said catch being engaged by said latching element in the low position of the float means when the lever is in its axially engaged position and is in said normal angular position, and being disengaged from said latch in any other position of the lever.
4. The invention according to claim 3,
   (a) said catch comprising a disc having a stepped portion blocked by said latching element to prevent axial movement of said lever in its normal angular position, and permitting such axial movement in the active angular position of the lever to engage said catch and latch to prevent the lever from moving toward its first angular position, said latch being disengaged from the catch in the high position of the float to cause the lever bias means to move the lever to its normal angular position while engaged with said projection, to actuate the control valve to its second position.
5. The invention according to claim 4, and a cam element on said disc arranged to engage a portion of said float means to vertically oscillate said float means during angular movement of said lever in order to free said float means against sticking.
6. The invention according to claim 5, and means normally biasing said control valve toward its neutral position, to stop operation of the hydraulic motor except when the control valve is being operated.

References Cited by the Examiner
UNITED STATES PATENTS

| | | | |
|---|---|---|---|
| 1,333,267 | 3/20 | Mapel | 137—410 XR |
| 2,548,354 | 4/51 | Davies | 137—410 XR |

WILLIAM F. O'DEA, *Primary Examiner.*